United States Patent [19]

Roggen

[11] 4,034,567

[45] July 12, 1977

[54] SELF-DRILLING THERMAL BOLT

[75] Inventor: Rolf Roggen, Grand-Lancy, Switzerland

[73] Assignee: Battelle Memorial Institute, Switzerland

[21] Appl. No.: 640,342

[22] Filed: Dec. 12, 1975

[30] Foreign Application Priority Data

Dec. 19, 1974 Switzerland .................... 16922/74

[51] Int. Cl.² .................................... E21D 20/00
[52] U.S. Cl. ................................. 61/35; 61/45 B; 175/11; 299/14
[58] Field of Search ............ 61/45 B, 53.54, 36 A, 61/39, 35; 175/11–18; 299/14; 85/63, 74

[56] References Cited

U.S. PATENT DOCUMENTS

| | | | |
|---|---|---|---|
| 1,494,003 | 5/1924 | Malcher | 175/13 X |
| 2,327,483 | 8/1943 | Aitchison et al. | 175/11 |
| 3,304,671 | 2/1967 | Kintish et al. | 61/36 A X |
| 3,357,505 | 12/1967 | Armstrong et al. | 175/16 |
| 3,460,223 | 8/1969 | Berczes et al. | 299/14 X |
| 3,609,980 | 10/1971 | Bowers | 175/11 X |
| 3,788,389 | 1/1974 | Waters | 61/36 A X |
| 3,807,182 | 4/1974 | Schnabel | 61/53.54 X |
| 3,885,832 | 5/1975 | Altseimer et al. | 299/14 |

FOREIGN PATENT DOCUMENTS 373,910  4/1923  Germany .................. 175/11

Primary Examiner—Dennis L. Taylor
Attorney, Agent, or Firm—Robert E. Burns; Emmanuel J. Lobato; Bruce L. Adams

[57] ABSTRACT

A self-implanting anchor comprising an elongated body having a first portion comprised of a consumable combustible material extending from a leading end of the body and back along the length of the body, and a second portion defining an anchor for implantation in a compact material and which extends from the first portion of the body and back along the length thereof. The elongated body includes a conduit extending axially therethrough and opening at the leading end of the body for supplying an oxidizer through the conduit to the consumable combustible material at the leading end. In use, the leading end portion is positioned against a surface of the compact material and the combustible material is ignited to melt the compact material in a vicinity of the leading end portion of the elongated body. The elongated body is then progressively advanced to progressively melt a portion of the compact material in the vicinity of the leading end portion until the anchor has penetrated the compact material to a certain depth. Combustion is then terminated and the anchor maintained in position at the certain depth until the melted compact material has solidified to secure the anchor in the compact material.

7 Claims, 9 Drawing Figures

SELF-DRILLING THERMAL BOLT

BACKGROUND OF THE INVENTION

This invention relates to self-drilling bolts.

The extremely rapid expansion experienced in the civil engineering sector, in particular in the construction field, and also the continuous improvement in construction techniques have given rise to the need for efficient processes which will enable anchoring bolts and pins, particularly those of large diameter, to be fixed rapidly and economically in hard walls, for example of reinforced concrete.

However, the processes employed at the present time are not at all satisfactory for this need. In fact, a whole series of operations has to be carried out in order to anchor a securing bolt by the traditional methods, namely: drilling a hole by, in general, mechanical means; clearing out the hole; sinking the securing bolt and finally plugging this bolt by appropriate means.

It has been proposed to provide the bolt itself with drilling teeth so that, when fixed to the end of a tool, it itself mechanically drills the hole in which it is to be subsequently anchored. These operations are not made easier however since it is also necessary to remove the bolt after the drilling so that the hole can be cleared out before inserting appropriate means which will ensure the subsequent anchoring of the bolt. Furthermore, such a process is relatively expensive and does not remove all the defects inherent in all the mechanical drilling methods, concerning the geometry of the tool employed as well as the difficulty in drilling composite materials.

In fact, working with composite materials by mechanical means poses special problems connected with the different characteristics of the elements comprising these materials. For example, the mechanical drilling of reinforced concrete by steel drilling bits means, in principle, changing from one type of tool to another depending on whether, at any given time during the drilling, concrete or steel is being drilled. In practice such a procedure is clearly not practicable, both on account of loss of time and the danger of damaging the tool heads.

A process for anchoring bolts in a refractory material has also been proposed, consisting in utilising the vibrational energy produced by a mechanical vibrator to effect the drilling by the bolt itself, the said bolt then being plugged in the drilled hole by means of a special alloy which first melts on account of the heat generated by friction and then cools around the bolt. Such a process is however relatively complex to put into operation and it remains strictly limited to the drilling of refractory materials, to the exclusion of composite materials.

Finally, bolt anchoring processes using explosives are known. These processes are however restricted to anchoring small diameter bolts, in general less than 8 mm in diameter.

SUMMARY OF THE INVENTION

The object of the present invention is to obviate the aforementioned disadvantages by proposing an anchoring method which involves processes of a thermal nature.

According to the present invention there is provided a process for anchoring a securing element in a material, characterised in that one end of an elongated member is maintained in contact with the said material, and at the said end combustion is effected which is capable of producing a sufficient amount of heat to bring at least the portion of the said material in the vicinity of the said end to a temperature at least equal to the melting point of the said material, so as to cause the said member to penetrate the said material to the extent that the portion of the material adjacent to the said end of the said member melts, instead. When the said member has penetrated the material to the desired depth the said combustion is stopped, while leaving the said member in the position corresponding to this depth. Fusion and/or combustion products ensure the anchorage of the said member in the said material by solidification and the said member thus anchored then constitutes the said securing element.

According to a further feature of the present invention there is also provided a member for use in this process, comprising an essentially elongated body of which at least the end intended to be inserted in the material to be drilled has a combustible charge, means to bring a combustion-supporting substance into intimate contact with this charge so as to enable combustion to be effected at this end whereby a temperature at least equal to the melting point of the material to be drilled can be achieved, and the other end of the body has securing means intended to enable objects to be attached to the said material once the said member having been anchored in the said material.

In order to carry out the anchoring process according to the invention, recourse is thus made to one and the same element, wherein the element is used initially to effect a thermal type drilling in a given material, and then serves, after the drilling has stopped, as a securing bolt permanently anchored in the material. Such a self-drilling bolt should preferably comprise three essential parts, namely: a head consisting of a thermal tool, a body part intended for anchoring the bolt in materials, and a tail part for attaching necessary objects to the said material after anchoring has been effected. The thermal drilling tool which constitutes the head of such a bolt may be any known thermal tool. The "thermal head" may particularly advantageously consist of a consumable tool of the "oxygen thermal lance" type, and in the description which follows reference will more especially be made to a thermal head of this type.

BRIEF DESCRIPTION OF THE DRAWING

The accompanying drawings show, diagrammatically and by way of example, two embodiments and also variants of a member for carrying out the process which is the subject of the present invention.

DESCRIPTION OF THE PREFERRED EMBODIMENTS

Figure 1:
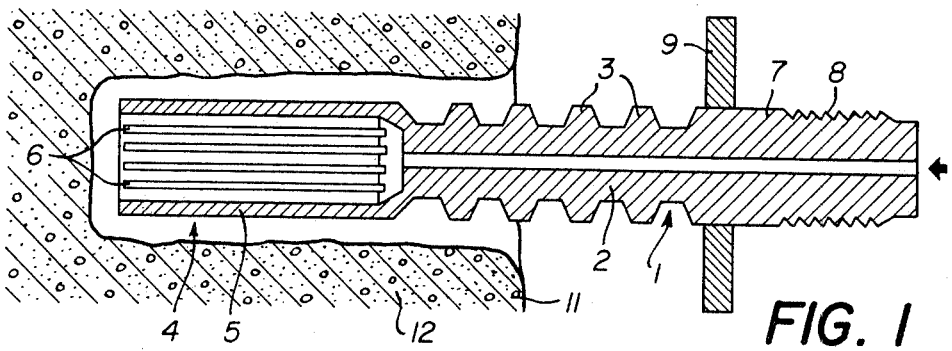
FIG. 1 is a longitudinal section of a first embodiment.

The self-drilling bolt shown in FIG. 1 comprises a tubular duct 1 of varying cross-section which is subdivided into three main parts, namely: a central tubular part or "body" 2 provided on the exterior with annular protruberances 3 located at regular intervals along this body, a head 4 consisting of a tube 5 filled with iron or steel rods 6, and a tail 7 provided on the exterior with a male thread 8. The external cross-section of the protruberances 3 is preferably chosen to be appreciably larger than the external cross-section of the head 4, although in FIG. 1 they are shown as equal. An annular plate member 9 having an external diameter clearly greater than that of the head 4 is secured around the tubular duct 1 between the body 2 and the tail 7. The tubes 5 and also the rods 6 are preferably made of a low carbon content iron or steel. A coupling, not shown, enables the end of the tail 7 to be connected to an external pressurised oxygen source (not shown).

The described self-drilling bolt operates as follows. When the tail has been connected to the pressurised oxygen source and a portion at least of the free end of the head 4 has been heated to red-heat by any appropriate means, for example by means of a blow-pipe or by placing an ignitable substance next to the end of the head, oxygen under pressure is then introduced into the interior of the duct 1 and the head 4 is placed against the surface 11 of the material 12 in which it is desired to anchor this bolt. When the oxygen reaches the red-hot end of the head 4 it produces a rapid combustion of the iron constituting this head. The intense local heat resulting from this strongly exothermic oxidation thus causes the material 12 situated in front of the head 4 of the bolt 1 to melt, the fusion products accumulate, in the free space between the tubular duct and the wall of the hole being formed as the bolt sinks into the material, and the surplus is forced back out of the hole. When the drilled material contains rocks or material based on silicates or aluminates, the melting process is assisted by the presence of iron oxides formed by the combustion, in that these oxides combine with these rocks or silicate or aluminate material and reduce the melting point and the viscosity. When the body 2 of the bolt 1 is fully sunk in the material 12, in other words when the member 9 rests against the wall 11, the combustion of the head 4 is stopped by switching off the oxygen supply. The molten material is then allowed to cool, with the result that when it has solidified it ensures that the bolt is packed and sealed in the material 12. Once the bolt has been sealed in, any objects may then be fixed as desired against the wall 11, for example by means of the male thread 8 which extends beyond the wall.

During the whole drilling operation the oxygen flow is regulated so as preferably to ensure the complete reaction of the oxygen reaching the head 4 at any instant, with the iron. This prevents molten material from flowing back out of the drilling hole as a result of an excess of pressurised oxygen.

The length of the consumable part of the bolt is determined by the depth required for anchoring it. A length of 30 cm will be selected for example in order to obtain a drilling depth of 10 cm.

Figure 2:
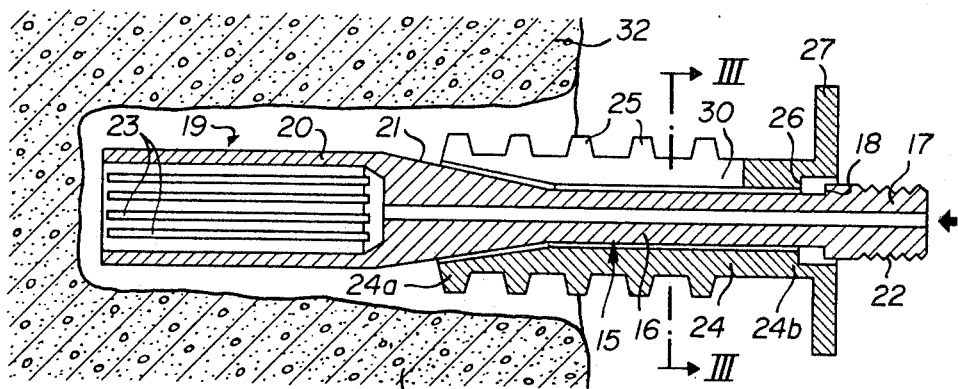
FIG. 2 is a view similar to that of FIG. 1, illustrating a variant of this embodiment.
Figure 3:
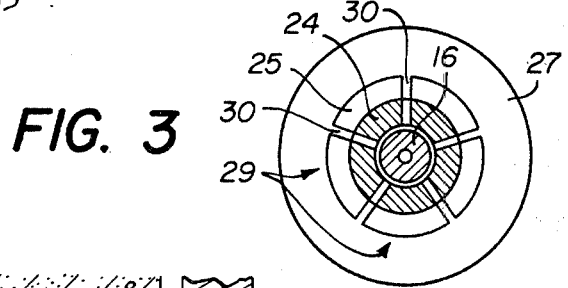
FIG. 3 is a transverse section along the line III—III of FIG. 21.
Figure 4:
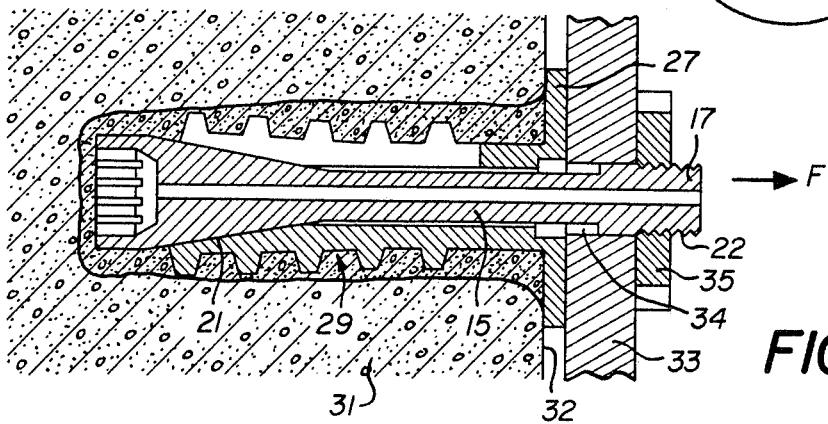
FIG. 4 is a longitudinal section of the variant of FIG. 2, in a second operating position.

The bolt variant shown in FIGS. 2 and 4 essentially differs from the embodiment shown in FIG. 1 by the addition of additional mechanical means intended to improve the anchorage of this bolt. This bolt (FIGS. 2 and 3) comprises a tubular duct 15 of varying cross-section which consists of a central pair or "cylindrical body" 16, a tail 17 of cross-section greater than that of the body 16 and fastened to the latter by an annular shoulder member 18, and a head 19 consisting of a cylindrical tube 20 of cross-section greater than that of the body 16 and joined to the latter by an intermediate tubular element 21 whose external shape is that of a truncated cone. The exterior of the tail 17 is provided with a male thread 22, while the tube 20, which is similar to the tube 5 in FIG. 1, is filled with iron rods 23. A coupling, not shown, enables the end of the tail 17 to be connected to an external source of compressed oxygen (not shown). A sleeve 24 provided on its exterior with annular protruberances 25 disposed at regular intervals throughout its whole length, and able to slide smoothly on the body 16, is mounted around said body 16.

The end 24a of this sleeve 24 situated adjacent to the head 19 has an internal wall in the shape of a truncated cone which matches the shape of the intermediate truncated cone-shaped element 21 connecting the body 16 to the head 19, while its other end 24b situated adjacent to the tail 17 has an internal shoulder member 26 whose shape matches that of the shoulder member 18 carried by the tail 17. This end 24b is also surrounded by a collar 27 whose external cross-section is considerably larger than that of the head 19. The sleeve 24 is furthermore sectioned into a plurality of longitudinal petal-shaped member 29 by longitudinal slits 30 which extend from a position close to the end 24b as far as the other end 24a.

The method of anchoring this bolt in a material 31 (FIG. 4) is substantially similar to that described previously.

The object of the sleeve 24 provided with its longitudinal petal-shaped members 29 is to improve the anchorage of the bolt in the material 31. Let us suppose in fact that it is desired to fix some object against the wall 32, for example a sheet element 33 pierced by a hole 34, by means of a nut 35 cooperating with the male thread 22. The effect of tightening the nut 35 against the element 33 is on the one hand to maintain the sleeve 24 sunk into the material 31 by urging the collar 27 against the wall 32, and on the other hand to withdraw the tubular duct 15 (in the direction shown by the arrow F in the drawing) so that the truncated cone-shaped element 21 forces the longitudinal petal-shaped members 29 to diverge from the axis of the bolt and become flattened against the wall of the drilling hole and engage therewith via proturberances 25. A mechanical packing of the "expansion" type is thus superimposed on a thermal type packing previously effected by solidification of the fusion and combustion products.

Figure 5:
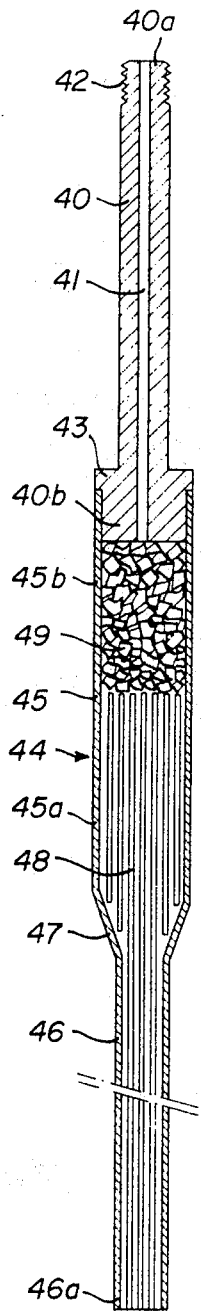
FIG. 5 is a longitudinal section of a second embodiment.
Figure 6:
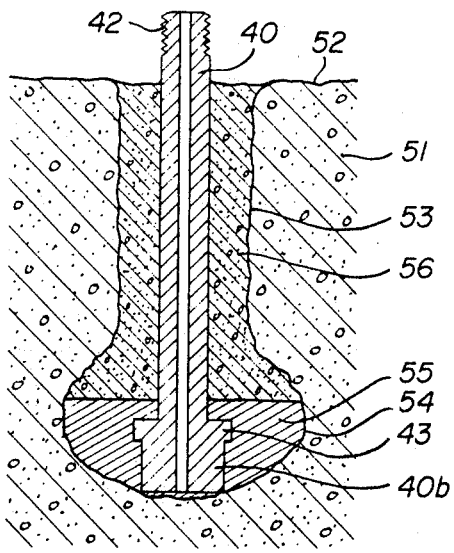
FIG. 6 is a longitudinal section of this second embodiment in a second operating position.

The embodiment shown in FIGS. 5 and 6 is aimed at providing a novel improvement in the anchoring of the bolt, FIG. 5 showing the bolt anchoring and FIG. 6 the bolt once it has been anchored. The self-drilling bolt shown in this FIG. 5 comprises a steel rod 40 through which passes axially a channel 41; this rod 40 is provided at one of its ends 40a with a thread 42 and, in the vicinity of the other end 40b, with an annular shoulder member 43. A tubular duct 44 made of low carbon content iron the steel and aligned with he rod 40 is secured to the latter end 40b. The tubular duct 44 comprises two separate sections 45 and 46, namely a first section 45 having an external cross-section substantially equal to that of the annular shoulder element 43, and a second section 46 having an external cross-section less than that of the first section 45 and being connected to the latter via an intermediate tubular element 47 having the shape of a truncated cone (section 46 is only partly shown in the diagram). The second section 46 as well as the intermdiate element 47 and the lower portion 45a of the first section 45 are filled with rods 48 of low carbon content iron or steel, the whole assembly being intended to form an oxygen lance of varying cross-section. To this end, the thickness of the tubular duct 44 as well as the cross-section of the rods 48 and their arrangement within this duct are chosen in a known manner so that the effect achieved is similar to that of conventional oxygen lances. The upper portion 45b of the first section 45 is filled with a granular material 49 which preferably possesses a good combustibility in oxygen and also a melting point lower than that of iron itself and/or of an iron alloy. Furthermore, and particularly advantageously, a granular material will be selected whose oxides will be able to increase the mechanical strength of the solid state molten material. The grain size spectrum of the material 49 is chosen sufficiently high to prevent any obstruction of the interstices between the different rods 48 by granules of this material. A ferro-silicon (for example $Fe_3Si$ will advantageously be used as material 49, and exhibits to a high degree the aforementioned properties. Other materials which have similar properties and which may also be used are for example ferro-manganese compounds, mixtures of silica and metallic powders, mixtures of the thermite type, or even cast iron.

In a variant (not shown), the mass 49 of loose granules is replaced by a solid body of the same chemical nature, arranged so as to allow the passage of oxygen to the lower end (in the diagram) of the bolt.

This bolt works as follows. It is assumed that a vertical drilling is carried out in the horizontal wall 52 of a certain material 51. The tail 40a of the bolt is connected to a pressurised oxygen source and the head 46a of this bolt is heated to red heat, following which oxygen is allowed to flow into the bolt so as to effect combustion of the head 46a. This head 46a is then applied to the wall 52 of the material 51 while exerting a slight pressure on the bolt, so as to cause it to penetrate progressively into the material 51 as the heat of combustion which it releases causes the material below the head to melt. The rate of advance of the bolt into the material is higher than the drilling rate since the bolt is being progressively burnt up.

Thus, when the section 46 of the bolt has been completely burnt up, a drilling hole 53 (FIG. 6) is obtained of specific cross-section and depth, which are functions of the external cross-section and the length of the section 46 respectively (the cross-section of the hole always remains greater than that of the section 46, taking into consideration both the lateral and longitudinal action exerted by the heat of combustion). It should be noted that the external diameter of the portion 45 should be chosen to be slightly less than the diameter of the hole which is capable of being drilled by the combustion of the section 46, and the said diameter will be directly related to the diameter of this section 46; in such a way as to allow this section 45 to penetrate into the hole. The increase undergone by the cross-section of the bolt has the effect, in proportion to the combustion, of not only deepening the drilling hole but especially of enlarging the bottom of the said hole. FIG. 6 shows diagrammatically the shape assumed by the enlarged bottom of the hole (the enlarged bottom is indicated in the drawing by the reference numeral 54) after the lower part 45a of the section 45 has been completely consumed by combustion. The upper part 45b of the section 45 filled with ferro-silicon granules then comes level with the enlarged bottom of this hole. From this time on the oxygen flow is reduced in the bolt so that the materials of the bolt largely melt and the remainder are consumed by combustion. The ferro-silicon, which has a higher density than the molten materials, progressively fills the enlarged bottom 54 of the drilling hole. The respective lengths of the lower part 45a and upper part 45b of the section 45 are chosen so as to obtain respectively an adequate enlargement of the bottom of the drilling hole and the practically complete filling of this enlarged bottom by the fusion products. The oxygen supply is stopped when this upper part 45b has been completely consumed. The metallic bath rapidly solidifies around the head 40b and the shoulder member 43 of the rod 40 (FIG. 6) to form, at the bottom of the hole 54, the anchorage for the bolt. The molten material 56 which fills the remainder of the hole also solidifies rapidly, and the rod 40 is then firmly embedded in the material 51.

Traction tests carried out on this rod 40 using a hydraulic jack for example have shown that, on condition that the rod 40 is sufficiently strong, it is the material 51 directly surrounding the drilled hole which breaks and not the bonding between this rod and the plug 55; most often the result of these traction tests is to cause a progressive crumbling along the edges of the drilling hole.

As an example, a self-drilling bolt is prepared having the following characteristics:

Cylindrical rod 40:
  diameter: 10 mm
  length: 350 mm
First section 45:
  diameter: 13 mm
  length of the upper part 45b: 200 mm
  length of the lower part 45a: 300 mm
Second section 46
  diameter: 6 mm
  length: 2000 mm Once the end of the bolt has been heated to red heat, the bolt is supplied with oxygen at a rate of about 1 Nl/sec. When the oxygen lance part of the bolt has been completely consumed the oxygen pressure is reduced so as to cause the remaining consumable part to melt. When this part is totally consumed the oxygen supply is stopped and the bolt is allowed to cool. The total operation leasts about 50 seconds. The depth of the hole obtained is about 180 mm. After the whole arrangement has cooled, such a bolt fixed in normal concrete can only be pulled out by exerting a continuous tractive force of the order of 4 to 5 tons.

Figure 7:
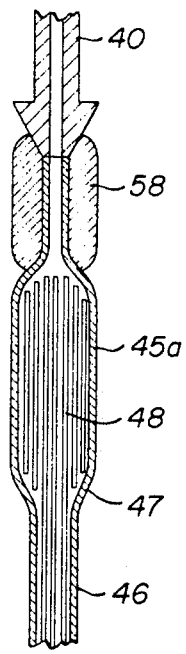
FIG. 7 is a partial longitudinal section illustrating a first variant of this second embodiment.

In the variant shown in FIG. 7 the ferro-silicon is arranged in the form of a sheath 58 around the bolt instead of being placed inside a part of the bolt.

Figure 8:
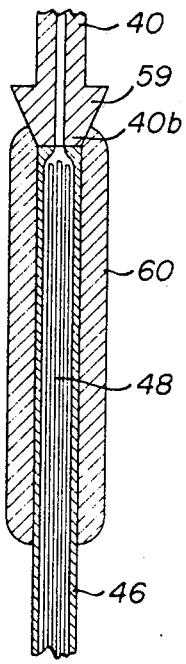
FIG. 8 is a longitudinal section illustrating a second variant.

In the variant of FIG. 8, the section 45 of larger cross-section is dispensed with and the end 40b of the rod 40 provided with a truncated cone-shaped protruberance 59 is directly connected to the section 46. The part of this section 46 adjacent to the rod 40 is covered with a ferro-silicon sheath 60 having an external cross-section substantially equal to the maximum cross-section of the truncated cone-shaped protruberance 59. In this variant the ferro-silicon sheath 60 has a double role: the function of the lower part of the sheath subjected to combustion (maintained by a high oxygen pressure) is to ensure the enlargement of the bottom of the drilling hole, whereas the upper part of this sheath, basically subjected to melting (maintained by a low oxygen pressure) ensures the formation of the metallic plug in the enlarged bottom of the hole.

Figure 9:
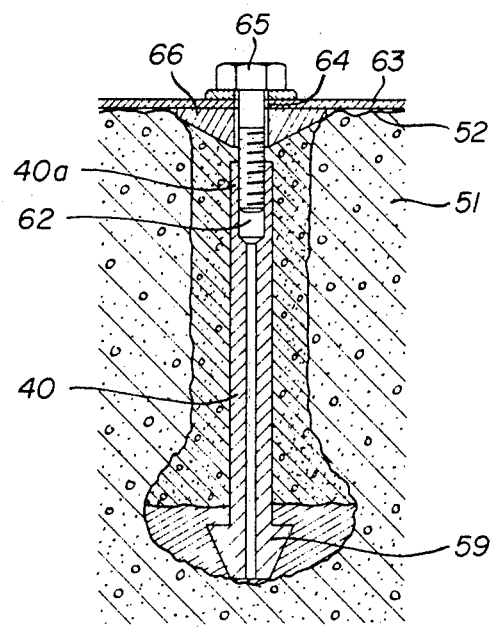
FIG. 9 is a view similar to that of FIG. 6, illustrating a third variant.

The depth of the drilling hole is basically determined by the nature of the material being drilled. This may pose some problems in certain cases where it is desired to achieve a very accurate positioning of the bolt. However, these problems can be solved in various ways, as is shown for example by the variant of FIG. 9. This variant embodies a rod 40 whose tail 40a is provided in the interior with a thread 62 and whose total length is appreciably less than the average depth of drilling envisaged: the rod is intended to be buried in the interior of the hole during drilling. The attachment of any object (shown in the diagram by a portion of sheet 63 with a hole 64) to the wall 52 of the material 51 may then be effected for example by means of a nut 65 and a centring cone 66.

Contrary to conventional drilling processes, the bolt according to the invention does not involve any rotational motion in order to ensure that it is embedded, and the cross-section of this bolt thus does not have to be of circular shape. Indeed, the cross-section may be of any shape, for example elliptical or polygonal which has the advantage of ensuring a better embedding of the bolt by preventing it turning within the material.

Finally, additives such as swelling agents may be added to the materials constituting the "thermal head" in order to compensate for any possible contraction or shrinkage of the molten material when it solidifies, or "thermite" type fillers may be added.

The self-drilling bolt according to the invention may be anchored in widely differing types of material: among these there may be mentioned mineral materials such as rock or stone, refractory materials, asphalt, concrete, reinforced concrete, metals in general, and in particular steels. The anchorage of such a bolt in iron-based materials is especially advantageous since the iron, which is itself present in the material, will during drilling provide some of the necessary energy for melting the latter.

The self-drilling thermal bolt which has been described can be used in many fields: civil engineering work, mining work, the construction industry and under-water work for example. This last application is especially interesting, considering the relative ease of operating thermal drilling processes under water. The positioning of anchoring bolts on sea-beds or lake-beds in order to secure insubmersible structures can thus be envisaged.

I claim:

1. A method of implanting an anchor in a compact material, comprising:
   a. positioning a leading end portion of an anchor to be implanted in a compact material against a surface of the compact material;
   b. effecting combustion at the leading end portion of the anchor and at a sufficiently high temperature to melt the compact material in a vicinity of the contact material immediately adjacent the leading end portion of the anchor;
   c. progressively penetrating the compact material with the anchor to a certain depth by advancing it leading end first into the compact material while maintaining combustion at the leading end portion to progressively melt a portion of the compact material in the vicinity of the leading end portion of the progressively advancing anchor to progressively completely melt the compact material ahead of the progressively advancing leading end portion; and
   d. terminating combustion after the anchor has penetrated the compact material to said certain depth and maintaining the anchor in position at said certain depth until the melted compact material and any combustion products have solidified, whereby the solidified material is effective to secure the anchor in the compact material.

2. A self-implanting anchor for implantation in a compact material, comprising: an elongated body having a first portion comprised of a consumable combustable material and extending from a leading end of the body and back along a longitudinal dimension of the body, and a second portion extending from the first portion of said body and along the longitudinal dimension of the body, said second portion defining an anchor for implanation in a compact material, said body including means for providing an oxidizer to the leading end of the body for effecting combustion of the consumable combustable material comprising the first portion of said body at the leading end thereof when it is sufficiently heated to ignite the consumable combustable material in the presence of an oxidizer, said consumable combustable material being of a type which releases sufficient heat during combustion to melt a compact material in which the anchor defined by the second portion of the body is to be implanted thereby to permit the anchor to be implanted by positioning the leading end of the body against the compact material and ignited to melt the compact material in the vicinity of the leading end and progressively advancing the ignited leading and to penetrate the compact material by progressively melting the same with the progressively advancing leading end portion undergoing combustion, until the anchor defined by the second portion of the body has penetrated the compact material to a sufficient depth, and thereafter stopping combustion and allowing the melted compact material and any combustion products to solidify with the anchor imbedded therein.

3. A self-implanting anchor according to claim 2, wherein the first portion of said body comprises a thermal lance element, and wherein said means for providing an oxidizer comprises a conduit extending axially through the elongated body and opening at the leading end of the body for supplying a oxidizer through the conduit to the leading end of the body.

4. A self-implanting anchor according to claim 2, wherein the first portion of the body is divided into three sections along the longitudinal dimension of the first portion, including a first section starting at the leading end of the body and having a first cross section and comprising a combustible material which releases sufficient heat during combustion to form a hole in the compact material for receiving the anchor, a second section starting after the first section and having a second cross section greater than the first cross section and comprising a combustable material which releases sufficient heat during combustion to enlarge the bottom of the hole in the compact material for receiving an anchor, and a third section starting after the second section and comprising a fusible material having a melting point less than the combustion temperatures of the combustable materials comprising said first and second sections for melting to form a plug in the enlarged bottom of the hole for receiving the anchor.

5. A self-implanting anchor according to claim 4, wherein the fusible material is a ferro-silicon compound.

6. A self-implanting anchor according to claim 4, wherein the second portion of the body which comprises an anchor includes an enlarged annular portion adjacent the first portion for being immersed in the melted fusible material during implanting, whereby the enlarged annular portion is embedded with the plug when the melted fusible material solidifies.

7. A self-implanting anchor according to claim 2, wherein the second portion of the body defining an anchor comprises steel.

* * * * *

Dedication 4,034,567.—*Rolf Roggen*, Grand-Lancy, Switzerland. SELF-DRILLING THERMAL BOLT. Patent dated July 12, 1977. Dedication filed Mar. 26, 1984, by the assignee, *Battelle Memorial Institute*.

Hereby dedicates to the People of the United States the entire remaining term of said patent.

[*Official Gazette May 22, 1984.*]